(12) United States Patent
Ikuta (10) Patent No.: US 7,591,326 B2
(45) Date of Patent: Sep. 22, 2009

(54) POWER TOOL

(75) Inventor: Hiroki Ikuta, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 11/651,000

(22) Filed: Jan. 9, 2007

(65) Prior Publication Data

US 2007/0158088 A1      Jul. 12, 2007

(30) Foreign Application Priority Data

Jan. 12, 2006    (JP) .............................. 2006-005414

(51) Int. Cl.
*F16D 7/00*         (2006.01)
(52) U.S. Cl. .................... 173/176; 173/178; 173/48; 173/170; 173/216; 173/217; 192/56.57; 192/56.62
(58) Field of Classification Search ................ 173/176, 173/178, 48, 170, 216, 217; 192/56.57, 56.62
See application file for complete search history.

(56) References Cited

U.S. PATENT DOCUMENTS

| | | | | |
|---|---|---|---|---|
| 3,616,883 | A | * | 11/1971 | Sindelar ................... 192/56.61 |
| 5,054,588 | A | * | 10/1991 | Thorp et al. ................. 477/178 |
| 5,092,441 | A | * | 3/1992 | Fujii ....................... 192/56.54 |
| 5,156,244 | A | * | 10/1992 | Pyles et al. .................. 477/178 |
| 5,738,177 | A | * | 4/1998 | Schell et al. ................. 173/178 |
| 5,842,527 | A | * | 12/1998 | Arakawa et al. ............... 173/48 |
| 6,085,849 | A | * | 7/2000 | Scigliuto ..................... 173/178 |

FOREIGN PATENT DOCUMENTS

| | | |
|---|---|---|
| DE | 195 07 558 A1 | 9/1995 |
| JP | A-7-328947 | 12/1995 |
| JP | A 09-57511 | 3/1997 |

* cited by examiner

*Primary Examiner*—Rinaldi I. Rada
*Assistant Examiner*—Michelle Lopez
(74) *Attorney, Agent, or Firm*—Oliff & Berridge, PLC (57) ABSTRACT

It is an object of the invention to provide an effective technique for improving the durability of a torque limiter utilized in a power tool. The object is achieved by a representative power tool comprising a tool bit, a driving mechanism and a torque limiter. The torque limiter includes first and second rotating members, a ball, a pressing member and an elastic member. The second rotating member includes a power transmitting region with a groove continuously formed from a deepest groove part to a shallowest groove part to allow torque transmission and a power transmission interrupted region with a groove shallower than the shallowest groove part of the power transmitting region to interrupts the torque transmission. According to this construction, when the ball is in the power transmitting region, the pressing member contacts the first rotating member and is held in a position in which the biasing force of the elastic member is prevented from acting upon the ball.

9 Claims, 5 Drawing Sheets

POWER TOOL

BACKGROUND OF THE INVENTION

1. Field of the Invention

The present invention relates to a power tool having a tool bit that performs a predetermined operation by rotating on its axis and more particularly, to a power tool having a torque limiter that selectively interrupts transmission of torque to the tool bit.

2. Description of the Related Art

Japanese non-examined laid-open patent publication No. 9-57511 discloses a hammer drill having a torque limiter. The known torque limiter has a torque transmitting ball between a driving-side rotating member in the form of a driving gear and a driven-side rotating member in the form of a driven flange which are coaxially dispose The ball is held in a radial holding groove formed in the driven flange and engages with a cam of the driving gear in the circumferential direction so that the torque of the driving gear is transmitted to the driven flange. When the torque acting between the driving gear and the driven flange exceeds a predetermined torque, the ball moves radially inward along the holding groove against the biasing formed of an elastic member (disc spring) via a pressing plate. Thus, the engagement of the ball with the cam of the gear is released and the torque transmission is interrupted.

It is essential for a torque limiter to constantly operate at a predetermined torque or to be configured to interrupt the torque transmission when the torque acting upon the driven flange exceeds a predetermined set value. The known torque limiter is configured such that the biasing force of the elastic member constantly acts upon the ball via the pressing plate. Therefore, the ball is not allowed to roll and the ball comes in point contact with the driving gear, the driven flange and the pressing plate. Thus, local wear is caused and in this connection, further improvement is required in durability.

SUMMARY OF THE INVENTION

Accordingly, it is an object of the invention to provide an effective technique for improving the durability of a torque limiter in a power tool.

The above-described problem can be solved by the features of claimed invention. As one of aspects of the invention, a representative power tool may have a tool bit that performs a predetermined operation by rotating on it axis, a driving mechanism that drives the tool bit, and a torque limiter to transmit torque of the driving mechanism when a torque acting upon the tool bit is lower than a predetermined set value, while interrupting the torque mission when the torque acting upon the tool bit exceeds the set value. The "power tool" according to this invention typically includes a drilling tool used for drilling operation on a workpiece. The power tool is not limited to the drilling tool, but can be suitably applied to power tools of various types which perform an operation by rotation of the tool bit, such as a grinding tool for grinding the workpiece, an electric wrench for fastening screws, and an electric circular saw for cutting operation.

The torque limiter according to the invention may include a first rotating member, a second rotating member, a ball, a pressing member and an elastic member. The first rotating member is disposed for rotation on a predetermined axis. The second rotating member is disposed such hat the second rotating member can rotate on the same axis as the first rotating member and a rotating peripheral surface of the second rotating member faces a rotating peripheral surface of the first rotating member.

The ball is held by the first rotating member such that the ball cannot move in the circumferential direction of the first rotating member. The ball serves to transmit torque between the first and second rotating members by engagement with the second rotating member in the circumferential direction. The pressing member is disposed for movement in the axial direction of the first rotating member and can contact the ball. The elastic member applies a biasing force in the axial direction of the first rotating member with respect to the ball via the pressing member.

Preferably, when the torque acting between the first and second rotating members is lower than the predetermined set value, the ball may be kept in engagement with the second rotating member. As a result, torque transmission between the first and second rotating members is effected. On the other hand, when the torque acting between the first and second rotating members exceeds the set value, the ball moves in the axial direction against the biasing force of the elastic member acting via the pressing member. As a result, the engagement of the ball with the second rotating member in the circumferential direction is released and thus the torque transmission between the first and second rotating members is released.

The second rotating member may include a power transmitting region, a power transmission interrupted region and preferably, an intermediate region. The power transmitting region comprises a groove continuously formed in the circumferential direction from a deepest groove part to a shallowest groove part to allow torque transmission between the first and second rotating members by engagement with the ball in the circumferential direction. The groove may preferably have the same curvature as the spherical surface of the ball. The groove that is "continuously formed in the circumferential direction" may preferably include a continuous linear groove, a continuous curved groove and a continuous groove formed in combination of a linear shape and a curved shape.

The power transmission interrupted region may include a groove continuously formed in the circumferential direction in a shallower depth than the shallowest groove part of the power transmitting region so as to interrupt the torque transmission between the first and second rotating members by release of the engagement with the ball in the circumferential direction. The groove may preferably maintain about the same curvature as the spherical surface of the ball. The groove may be continuously formed in the circumferential direction in about the same depth as the shallowest groove part.

Further, the intermediate region may preferably be provided to include a groove continuously formed in the circumferential direction in a depth deeper than or equal to the deepest groove part of the power transmitting region to allow the ball disengaged from the power transmission interrupted region to move relative to the intermediate region in the circumferential direction from the power transmission interrupted region to the power transmitting region. The groove may preferably have the same curvature as the spherical surface of the ball. Further, the groove may preferably may role during the movement to the power transmitting region.

The intermediate region according to the invention may be defined by a region where torque cannot be transmitted such that a ball is allowed to move relative to the intermediate region in the circumferential direction from the power mission interrupted region to the power transmitting region. The groove may typically be continuously formed in the circumferential direction in about the same depth as the deepest groove part. Preferably, when the ball is in the intermediate region and in the power transmitting region, the pressing member may contact the first rotating member and may be held in a position in which the biasing force of the elastic member does not act upon the ball. On the other hand, when torque acting upon the tool bit exceeds a set value and the ball is moved from the power transmitting region to the power transmission interrupted region, the pressing member may be pushed by the ball in the axial direction and applies the biasing force of the elastic member to the ball.

According to the invention, when the ball is in the power transmitting region which allows torque transmission between the first and second rotating members, the pressing member contacts the first rotating member, so that the biasing force of the elastic member does not act upon the ball. Therefore, load upon the contact area between the ball and the second rotating member in the torque transmission state can be reduced and as a result, wear of the ball and the second rotating member can be reduced to enhance the durability of the power tool.

Further, when each of the power transmitting region and the power transmission interrupted region (and the intermediate region if it is provided) includes a groove with a curved surface having about the same curvature as the spherical surface of the ball, the ball is able to come in line contact with the second rotating member. Thus, the area of such contact can be increased compared with the known technique by point contact, so that wear of the ball and the second rotating member can be further reduced to enhance the durability of the power tool.

Further, when the groove of the intermediate region is continuously formed in the circumferential direction in a depth deeper than or equal to the deepest groove part of the power transmitting region and allows the ball located in the groove of the intermediate region to move relative to the groove while rolling in the groove, the contact area of the ball with respect to the second rotating member changes by the rolling movement. Thus, local wear of the ball can be reduced.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tool and method for using such power tools and devices utilized therein. Representative example of present invention, which examples utilized many of these additional features and method step conjunction, will now be described in detail with reference to the drawing. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
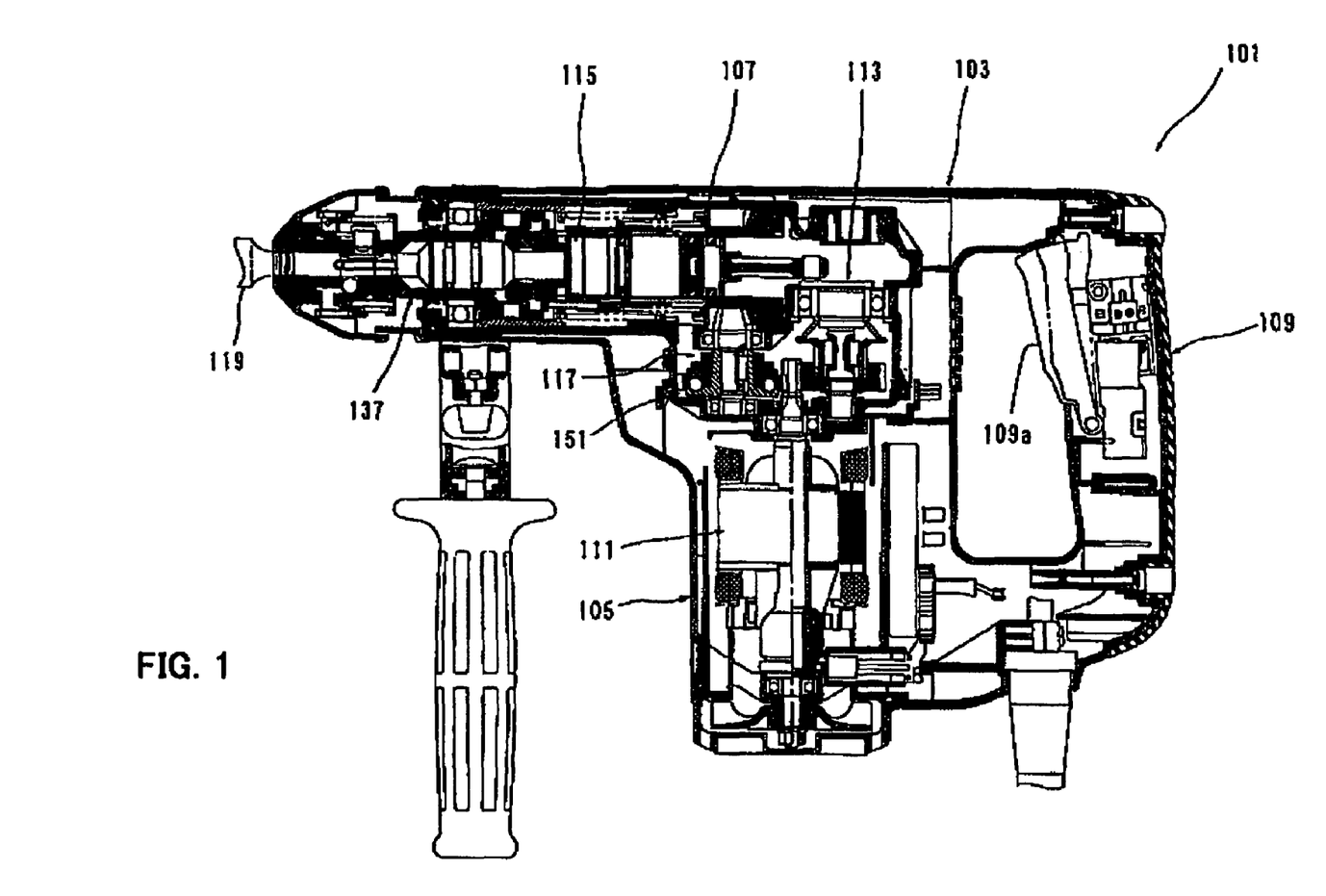
FIG. 1 is a sectional side view schematically showing an entire hammer drill according to an embodiment of the invention.

A representative embodiment of the present invention will now be described with reference to FIGS. 1 to 3. FIG. 1 is a sectional side view showing an entire electric hammer drill 101 as a representative embodiment of the power tool according to the invention. As shown in FIG. 1, the representative hammer drill 101 includes a body 103, a hammer bit 119 detachably coupled to the tip end region (on the left side as viewed in FIG. 1) of the body 103 via a hollow tool holder 137, and a hand grip 109 that is held by a user and connected to the body 103 on the side opposite to the hammer drill 119. The hammer bit 119 is held by tool holder 137 such that it is allowed to reciprocate with respect to the tool holder 137 in its axial direction and prevented from rotating with respect to the tool holder in its circumferential direction. The hammer bit 119 is a feature that corresponds to the "tool bit" according to the present invention. In the present embodiment, for sake of convenience of explanation, the side of the hammer bit 119 is taken as the front side and the side of the hand grip 109 as the rear side.

The body 103 includes a motor housing 105 that houses a driving motor 111, and a gear housing 107 that houses a motion converting mechanism 131, a striking mechanism 115 and a power transmitting mechanism 117. The motion converting mechanism 113 is adapted to appropriately convert the rotating output of the driving motor 111 to linear motion and then to transmit it to the striking mechanism 115. As a result, an impact force is generated in the axial direction of the hammer bit 119 via the striking mechanism 115. Further, the speed of the rotating output of the driving motor 111 is appropriately reduced by the power transmitting mechanism 117 and then transmitted to the hammer bit 119. As a result, the hammer bit 119 is caused to rotate in the circumferential direction. The driving motor 111 is driven when a trigger 109a on the hand grip 109 is depressed.

Figure 2:
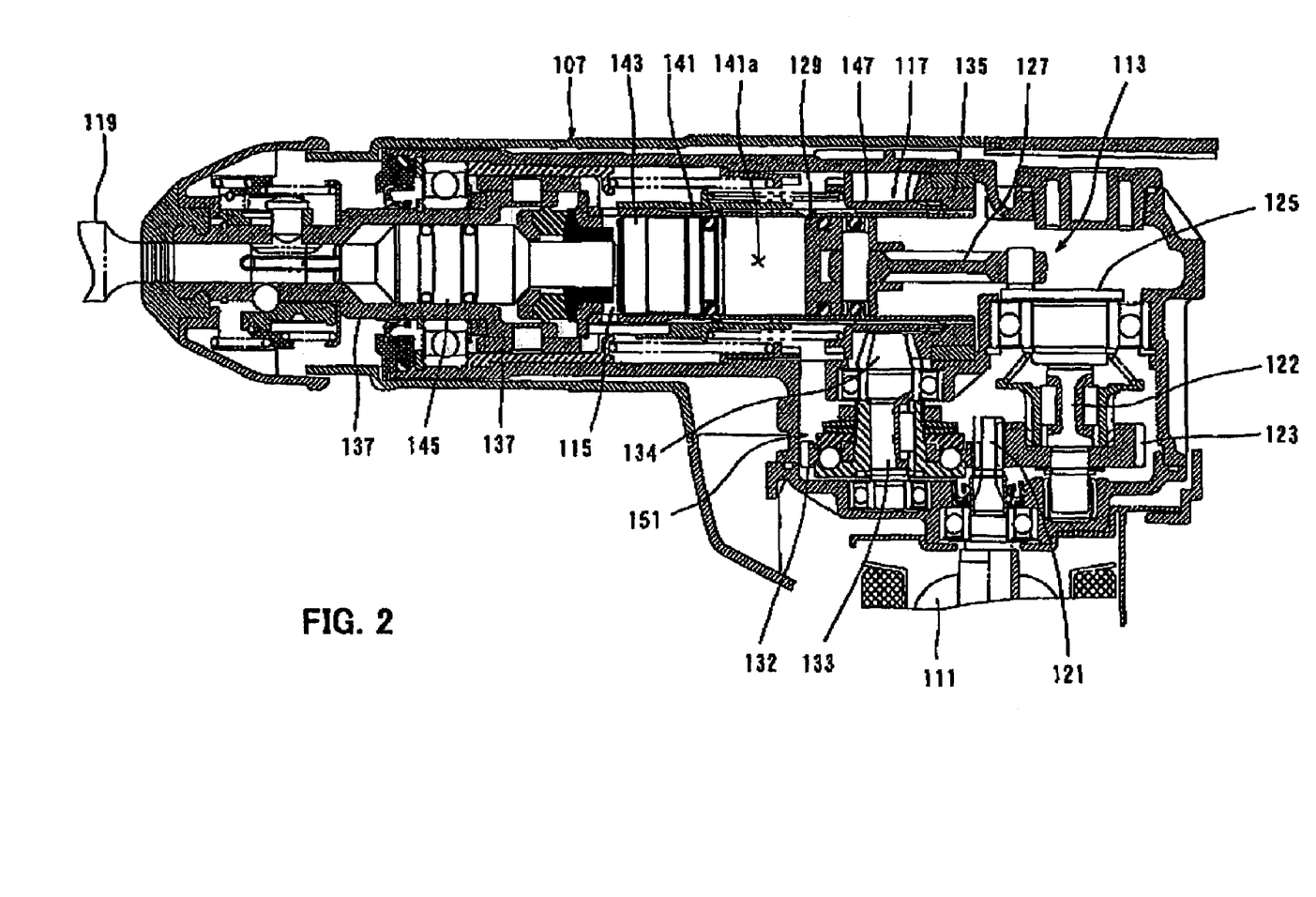
FIG. 2 is a sectional side view of an essential part of the hammer drill.

FIG. 2 shows an essential part of the hammer drill 101 in enlarged sectional view. The motion converting mechanism 131 includes a driving gear 121 that is rotates in a horizontal plane by the driving motor 111, a driven gear 123, a crank shaft 122, a crank plate 125, a crank arm 127 and a driving element in the form of a piston 129. The crank shaft 122 the crank plate 125, the crank arm 127 and the piston 129 form a crank mechanism 114. The piston 129 is slidably disposed within the cylinder 141 and reciprocates along the cylinder 141 when the driving motor 111 is driven.

The striking mechanism 115 mainly includes a strike 143 and an impact bolt 145. The striker 143 is slidably disposed within the bore of the cylinder 141. The impact bolt 145 is slidably disposed within the tool holder 137 and serves as an intermediate element to transmit the kinetic energy of the striker 143 to the hammer bit 119. The striker 143 is driven via the action of an air spring of an air chamber 141a of the cylinder 141 which is caused by sliding movement of the piston 129. The striker 143 then collides with (strikes) the impact bolt 145 that is slidably disposed within the tool holder 137, and transmit the striking force to the hammer bit 119 via the impact bolt 145.

The power transmitting mechanism 117 includes an intermediate gear 132 that engages with the driving gear 121, an intermediate shaft 133 that rotates together with the intermediate gear 132 via a torque limiter 151, a small bevel gear 134 that is caused to rotate in a horizontal plane together with the intermediate shaft 133, a large bevel gear 135 that engages with the small level gear 134 and rotates in a vertical plane, and a slide sleeve 147 that engages with the large bevel gear 135 and is caused to rotate. The rotation driving force of the slide sleeve 147 is transmitted to the tool holder 137 via the cylinder 141 which rotates together with the slide sleeve 147, and then further transmitted to the hammer bit 119 held by the tool holder 137.

In the hammer drill 101 thus constructed, when the user depresses the trigger 109a to drive the driving motor 111, the piston 129 is caused to linearly slide along the cylinder 141 via the motion converting mechanism 113 which mainly includes the crank mechanism. The striker 143 is caused to reciprocate within the cylinder 141 via the action of an air spring or pressure fluctuation of air within the air chamber 141a of the cylinder 141 which is caused by sliding movement of the piston 129. The striker 143 then collides with the impact bolt 145 and to the kinetic energy to the hammer bit 119.

Meanwhile, the rotating output of the driving motor 111 is transmitted as rotation to the cylinder 141 via the power transmitting mechanism 117. The cylinder 141 is caused to rotate in a vertical plane, and the tool holder 137 fixedly connected to the cylinder 141 via a connecting pin 171 is caused to rotate. Further, the hammer bit 119 held by the tool holder 137 rotates together with the tool holder 137. Thus, the hammer bit 119 performs hammering movement in its axial direction and drilling movement in its circumferential direction, so that a hammer-drill operation is performed on a workpiece (concrete).

The hammer drill 101 according to his embodiment can be switched among the above-mentioned hammer drill mode in which the hammer bit 119 is caused to perform both the hammering movement in the axial direction and the during movement in the circumferential direction, a drill mode in which the hammer bit 119 is caused to perform only the drilling movement, and a hammer mode in which the hammer bit 119 is caused to perform only the hammering movement. A mode switching mechanism for such mode change is not directly related to the present invention and thus will not be described The torque limiter 151 of the power transmission mechanism 117 will now be described with reference to FIGS. 3 to 9. FIG. 3 shows the entire torque limiter 151. The torque limiter 151 serves to transmit torque of the power transmission mechanism 117 when the torque acting upon the hammer bit 119 is lower than a set value and to interrupt the torque transmission when the torque acting upon the hammer bit 119 exceeds the set value.

The torque limiter 151 mainly includes an intermediate gear 132 rotated by the driving gear 121 (see FIG. 2), a driven flange 153 connected to the intermediate shaft 133 via a key 133a, a plurality of balls 155 that transmit torque of the intermediate gear 132 to the driven flange 153, and a disc spring 159 that applies a spring force to the balls 155 via a pressing plate 157 so as to retain the balls 155 in a torque transmitting position. The intermediate gear 132, the driven flange 153, the pressing plate 157 and the disc spring 159 are features that correspond to the "first rotating member", the "second rotating member", the "pressing member" and the "elastic member", respectively, according to the invention.

The intermediate gear 132, the immediate shaft 133, the driven flange 153, the pressing plate 157 and the disc spring 159 are coaxially disposed in layer in the vertical direction (in a direction crossing the axial direction of the hammer bit 119). The intermediate gear 132 is sandwiched between the driven flange 153 and the pressing plate 157 which are oppositely disposed under and on the intermediate gear 132, respectively. A plurality of ball receiving holes 132a are formed in the intermediate gear 132 at predetermined intervals in the direction of circumference on the axis of rotation of the intermediate gear 132. The ball receiving holes 132a are through holes formed though the intermediate gear 132 in the axial direction and having a circular section. Balls 155 are fitted in the respective ball receiving holes 132a. A lower end portion of each of the balls 155 protrudes from the lower surface of the intermediate gear 132, and an upper end portion of each of the balls 155 protrudes from the upper surface of the intermediate gear 132 and can contact the lower surface of the pressing plate 157. The pressing plate 157 is loosely fitted onto a cylindrical portion 153a of the driven flange 153, and the disc spring 159 is superposed on the pressing plate 157. The disc spring 159 is positioned on the cylindrical portion 153a by a nut 161.

Figure 4:
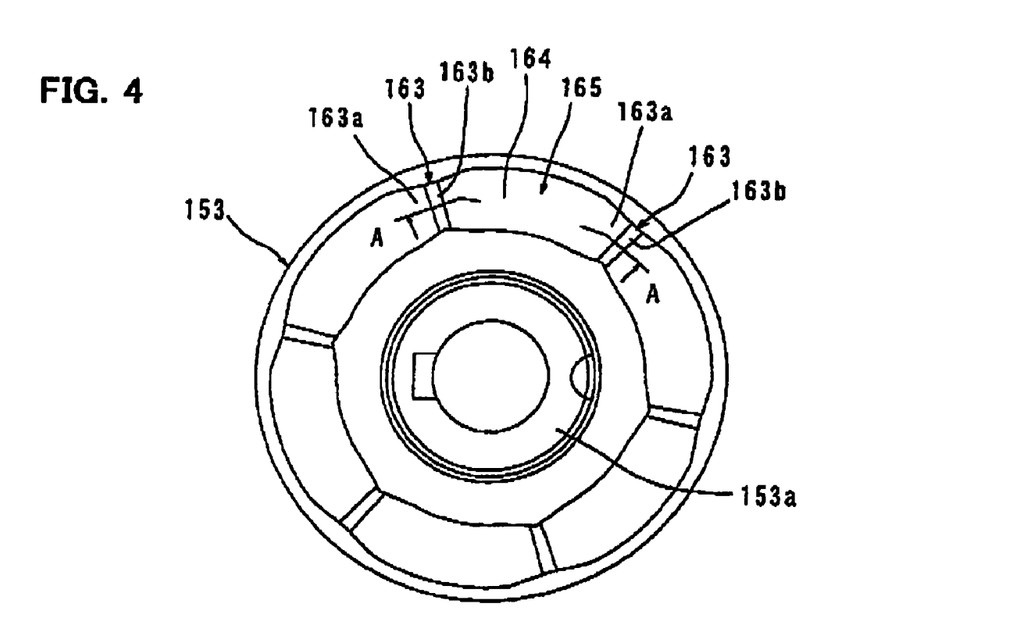
FIG. 4 is a plan view of a driven flange.
Figure 5:
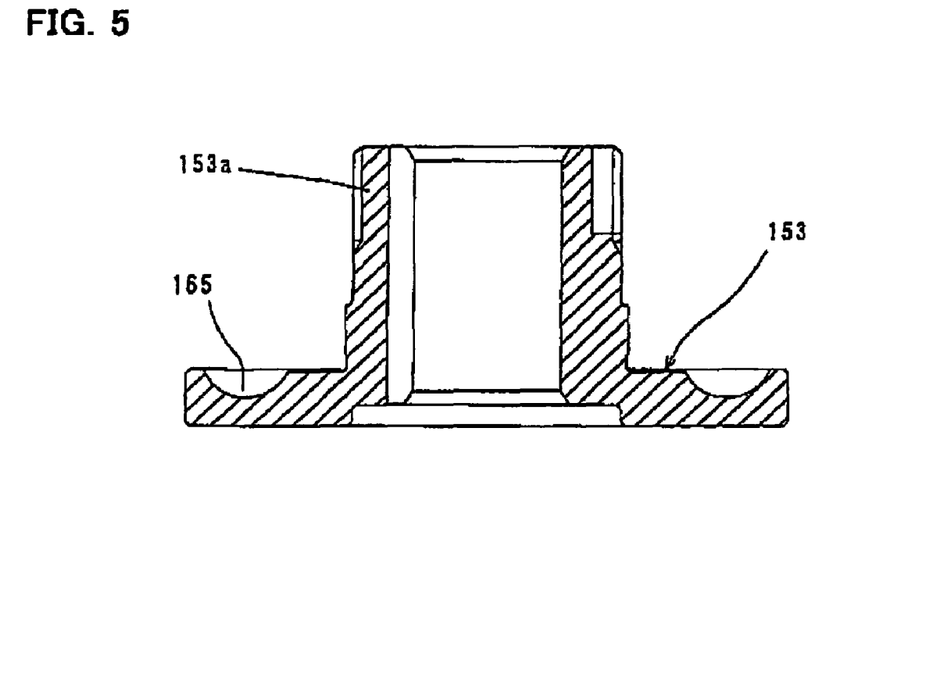
FIG. 5 is a longitudinal section of the driven flange.
Figure 6:
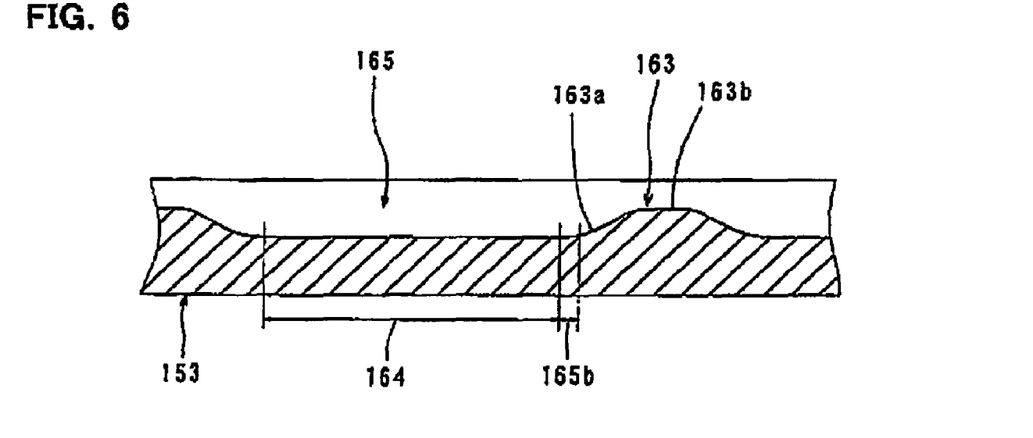
FIG. 6 is a development section taken along line A-A in FIG. 4.
Figure 7:
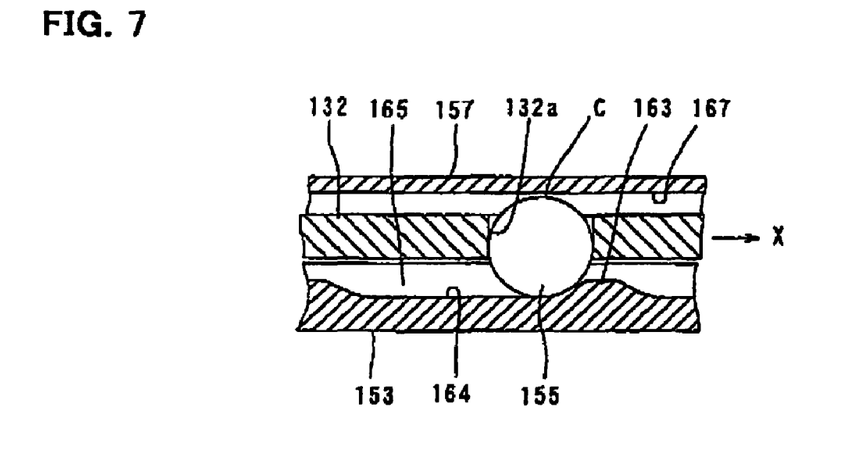
FIG. 7 illustrates the state in which torque is transmitted between an intermediate gear and the driven flange.
Figure 8:
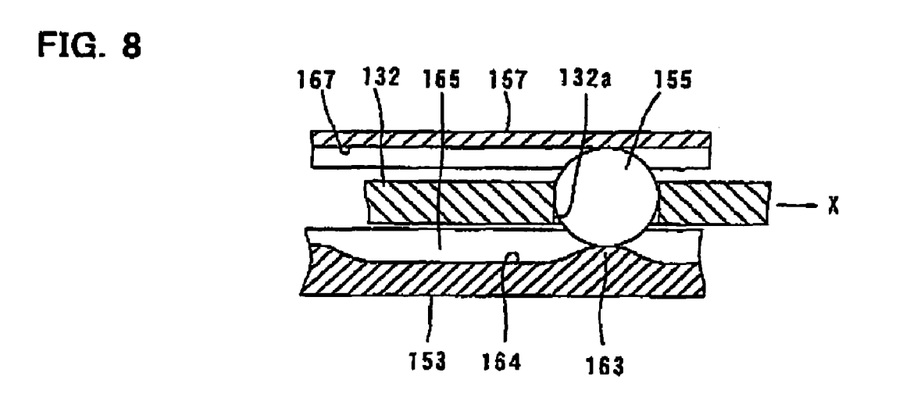
FIG. 8 illustrates the state in which the torque transmission between the intermediate gear and the driven flange is interrupted.

FIGS. 4 and 5 show the driven flange 153. A plurality (the same number as the balls; six in this embodiment) of cams 163 are formed in a contact surface of the driven flange 153 which contacts the balls 155 and at predetermined intervals in the direction of circumference on the axis of the driven flange 153 and protrude in the axial direction of the driven flange 153 (see FIG. 4). As shown in FIG. 6, each of the cams 163 has an inclined surface 163a and a flat surface 163b. When each of the balls 155 engages the associated inclined surface 163a of the cam 163 in the direction of rotation, the torque of the intermediate gear 132 is Knitted to the driven flange 153 (see FIG. 7). When the ball 155 moves up along the inclined surface 163a of the cam 163 onto the flat surface 163b of the cam 163 while pushing up the pressing plate 157 against the biasing force of the disc spring 159, the engagement of the ball 155 with the inclined surface 163a of the cam 163 is released. Thus, the torque transmission from the intermediate gear 132 to the driven flange 153 is interrupted (see FIG. 8). The inclined surface 163a and the flat surface 163b of the cam 163 are features that compound to the "power transmitting region" and the "power transmission interrupted region", respectively, according to this invention. In FIGS. 7 and 8, the direction of rotation of the intermediate gear 132 is shown by an arrow X Further, the driven flange 153 has cam-to-cam regions 164 between the cams 163. Each of the cam-to-cam regions 164 is flat in the circumferential direction and allows the ball 155 to move from the flat surface 163b of the cam 163 to the inclined surface 163a of the adjacent cam 163. The cam-to-cam region 164 is a feature that corresponds to the "intermediate region" according to is invention.

A circumferential groove 165 is formed in the contact surface of the driven flange 153 which contacts the ball 155 and extends throughout its circumference including the cams 163. The circumferential groove 165 has a curved surface having about the same curvature as the curvature of the spherical surface of the ball 155. Thus, the ball 155 comes in line contact with the driven flange 153, whether the ball 155 is located in the cam-to-cam region 164 or on the inclined surface 163a or the flat surface 163b of the cam 163. The groove 165 of the inclined surface 163a is continuously formed in the circumferential direction while keeping about the same curvature as the spherical surface of the ball 155 from the deepest groove part up to the shallowest groove part The groove 165 of the flat she 163b is continuously formed in the circumferential direction in about the same depth as the shallowest groove part of the groove 165 of the inclined surface 163a while keeping about the same curvature as the spherical surface of the ball 155. Further, a circumferential groove 167 is formed in the surface of contact of the pressing plate 157 with the ball 155 throughout its circumference. Thus, the ball 155 also comes in line contact with the pressing plate 157.

Figure 3:
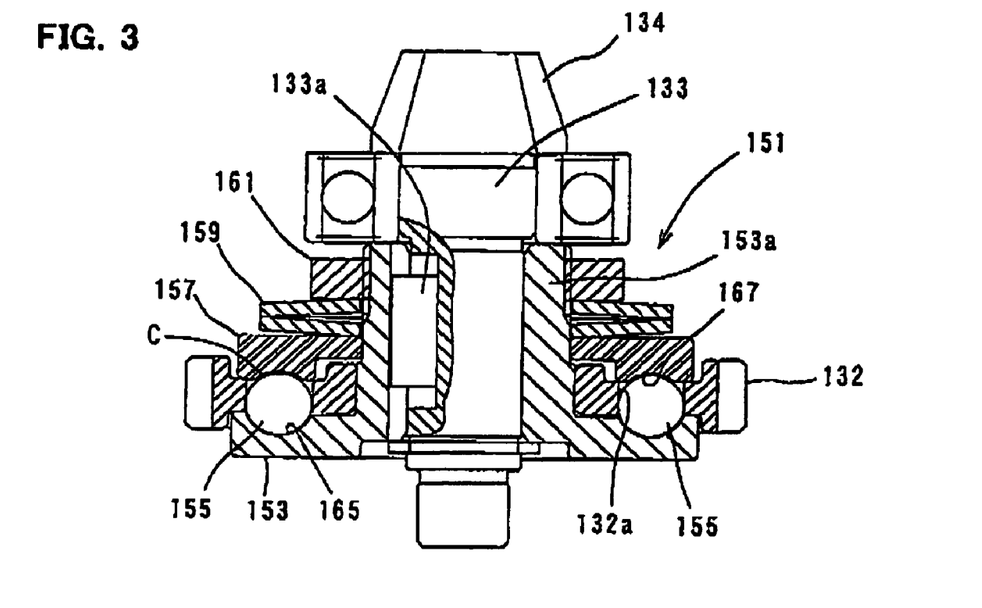
FIG. 3 is a longitudinal section showing an entire torque limiter.

In the groove 165 formed throughout the circumference of the driven flange 153, a portion of the groove 165 in the cam-to-cam region 164 between the cams 163 or in the region of the groove 165 excluding the cams 163 has such a depth that the lower surface of the pressing plate 157 contacts the upper surface of the intermediate gear 132 and a predetermined clearance C is created between the lower surface of the pressing plate 157 and the ball 155 when the ball 155 is in the cam-to-cam region 164 (see FIGS. 3 and 7). Specifically, the groove 165 in the cam-to-cam region 164 is continuously formed in the circumferential direction in about the same depth as the deepest groove part of the groove 165 on the inclined surface 163a of the cam 163, while keeping about the same curvature as the spherical surface of the ball 155. Therefore, in this construction, when the ball 155 is in the cam-to-cam region 164 and when the ball 155 is in the torque transmitting position in which the ball 155 engages with the inclined surface 163a of the cam 163, the biasing force (load) of the disc spring 159 does not act upon the ball 155. Specifically, the driven flange 153 has a biasing force non-applied region in which the biasing force of the disc spring 159 is not applied to the ball 155. Further, when the ball 155 is in the cam-to-cam region 164, the ball 155 is allowed to roll.

Figure 9:
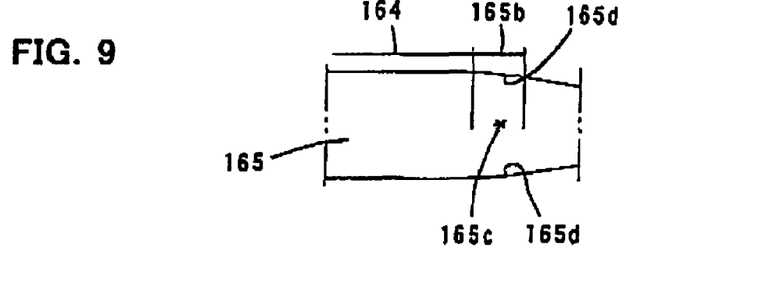
FIG. 9 illustrates the grooved shape of an engagement region which engages with the ball when torque is transmitted.

Further, in the groove 165 on the inclined surface 163a of the can 163, a boundary region between the inclined surface 163a and the end of the cam-to region 164 comprises an engagement region 165b in which the ball 155 engages with the inclined surface 163a of the cam 163 for torque transmission. As shown in FIG. 9, in this engagement region 165b, the groove 165 has a bottom 165c and a side wall 165d, both comprising a curved surface having about the same curvature as the spherical surface of the ball 155. Thus, the engagement region 165b comprises a generally spherical concave surface. Therefore, in the power transmitting position in which the ball 155 is located in the engagement region 165b, the ball 155 comes in surface contact with the groove 165.

Operation of the torque limiter 151 constructed as described above will now be explained. When the driving motor 111 is driven in order to perform a hammer drill op on or a drilling operation using the hammer drill 101, in the state in which the torque acting upon the hammer bit 119 is lower than a predetermined torque, the ball 155 engages with the inclined surface 163a of the cam 163 of the driven flange 153 and the torque of the intermediate gear 132 is transmitted to the driven flange 153 (see FIG. 7). Therefore, the hammer bit 119 is driven by the rotation driving force transmitted from the driven flange 153 via the intermediate shaft 133, the small bevel gear 134, the large bevel gear 135, the slide sleeve 147, the cylinder 141 and the tool holder 137. When the hammer bit 119 is driven, the pressing plate 157 contacts the upper surface of the intermediate gear 132, so that the ball 155 is kept free from the influence of the biasing force of the disc spring 159. At this time, the position of engagement (the power transmitting position) between the ball 155 and the cam 163 is allowed to change with fluctuations of torque acting upon the hammer bit 119. Specifically, the ball 155 is allowed to transmit the torque while changing the position between a contact position and a non-contact position with respect to the lower surface (the groove 167) of the pressing plate 157.

On the other hand, when the torque acting upon the hammer bit 119 exceeds a predetermined value, the ball 155 moves up along the inclined surface 163a of the cam 163 onto the flat surface 163b of the cam 163 while pushing up the pressing plate 157 against the biasing force of the disc spring 159. Thus, the engagement of the ball 155 with the cam 163 is released (see FIG. 8). As a result, transmission of torque from the intermediate gear 132 to the driven flange 153 is released.

In this embodiment, the grooves 165, 167 are formed in contact parts of the driven flange 153 and the pressing plate 157 which contact the ball 155, selectively, and comprise respective curved surfaces having the same curvature as the spherical surface of the ball 155. Thus, the ball 155 can come in line contact with the driven flange 153 and the pressing plate 157. Therefore, the areas of the contact parts of the driven flange 153 and the pressing plate 157 which contact the ball 155 increase compared with the known technique by point contact. Therefore, wear of the ball 155, the driven flange 153 and the pressing plate 157 can be reduced Further, according to this embodiment, the groove 165 formed throughout the circumference of the driven flange 153 is configured to be deeper in the cam-to-cam region 164 between the adjacent cams 163 than in the other region or the region of the cam 163. When the ball 155 is placed in the cam-to cam region 164, the pressing plate 157 contacts the upper surface of the intermediate gear 132 and a predetermined clearance C is created between the pressing plate 157 and the ball 155. Thus, the biasing force of the disc spring 159 does not act upon the ball 155. Further, when the ball 155 is in the cam-to-cam region 164, the ball 155 is allowed to freely roll. Therefore, the contact area of the ball 155 with respect to the driven flange 153 or the pressing plate 157 constantly changes. As a result, local wear of the ball 155 can be reduced.

Further, in this embodiment, in the engagement region 165b in which the ball 155 engages with the inclined surface 163a of the cam 163, in order to allow the ball 155 to transmit torque to the driven flange 153, the bottom 165c and the side wall 165d of the groove 165 of the driven flange 153 comprise curved surfaces having about the same curvature as the spherical surface of the ball 155, so that the engagement region 165b comprises a generally spherical concave surface. With this construction, in the engagement region 165b, the ball 155 comes in surface contact with the groove 165. Therefore, the force acting upon the ball 155 and the driven flange 153 per unit area during torque transmission can be reduced, so that the wear of the ball 155 and the driven flange 153 can be further reduced. Thus, according to this embodiment, the durability of the torque limiter 151 can be improved.

Further, the torque limiter 151 described in this embodiment is of the type in which torque is transmitted when the ball 155 held by the intermediate gear 132 engages with the cam 163 of the driven flange 153, while the torque transmission is interrupted when the ball 155 moves in the axial direction of the intermediate gear 132 and is disengaged from the cam 163. However, this invention can also be applied to a torque limiter of the type disclosed as the prior art in which torque is transmitted when the ball held by the driven flange 153 engages with the cam 163 formed in the intermediate gear 132, while the torque transmission is interrupted when the ball 155 moves in the radial direction of the driven flange 153 and is disengaged from the cam 163.

Further, in this embodiment, the hammer drill 101 is described as an example of the power tool of the present invention. However, this invention can also be applied to any power tool which performs a predetermined operation by rotation of the tool bit

DESCRIPTION OF NUMERALS

101 hammer drill (power tool)
103 body
103 motor housing
107 gear housing
109 handgrip
109*a* trigger
111 driving motor
113 motion converting mechanism
115 striking mechanism
117 power transmitting mechanism
119 hammer bit (tool bit)
121 driving gear
123 driven gear
125 crank plate
127 crank arm
129 piston
132 intermediate gear (first rotating member)
132*a* ball receiving hole
133 intermediate shaft
133*a* key
134 small bevel gear
135 large bevel gear
137 tool holder
141 cylinder
141*a* air chamber
143 striker
145 impact bolt
147 slide sleeve
151 torque limiter
153 driven flange (second rotating member)
153*a* cylindrical portion
155 ball
157 pressing plate (pressing member)
159 disc spring (elastic member)
161 nut
163 cam
163*a* inclined surface (torque transmitting region)
163*b* flat surface (torque transmission interrupted region)
164 cam-to-cam region C intermediate region)
165*b* engagement region
165*c* bottom
165*d* side wall
167 groove of the pressing plate

What we claim is:

1. A power tool, comprising:
   a tool bit that performs a predetermined operation by rotating around its longitudinal axis,
   a driving mechanism that drives the tool bit, and
   a torque limiter engaged with the driving mechanism that transmits a torque of the driving mechanism to the tool bit when a torque acting upon the tool bit is lower than a predetermined set value, while interrupting the torque transmission of the driving mechanism when the torque acting upon the tool bit exceeds the set value,
   wherein the torque limiter comprises:
      a first rotating member rotatably disposed with respect to a predetermined axis crossing the longitudinal direction of the tool bit,
      a second rotating member disposed such that the second rotating member is rotated on the same axis as the first rotating member and a rotating peripheral surface of the second rotating member faces a rotating peripheral surface of the first rotating member,
      a ball held by the first rotating member such that the ball is prevented from relatively moving in a circumferential direction with respect to the first rotating member, the ball transmitting torque of the driving mechanism between the first and second rotating members by engaging with the second rotating member in the circumferential direction,
      a pressing member movably disposed in an axial direction of the first rotating member to contact the ball, and
   an elastic member that applies a biasing force in the axial direction of the first rotating member with respect to the ball via the pressing member,
      wherein the second rotating member comprises:
         a power transmitting region comprising a groove that is continuously formed in the circumferential direction from a deepest groove part to a shallowest groove part to allow torque transmission between the first and second rotating members by engagement with the ball in the circumferential direction, and
      a power transmission interrupted region comprising a groove that is continuously formed in the circumferential direction in a depth shallower than or equal to the shallowest groove part of the power transmitting region to interrupt the torque transmission between the first and second rotating members by release of the engagement with the ball in the circumferential direction,
   wherein, when the ball is in the power transmitting region, the pressing member contacts the first rotating member such that the biasing force of the elastic member is prevented from acting upon the ball, while, when the ball is moved from the power transmitting region to the power transmission interrupted region, the pressing member is pushed by the ball in the axial direction and applies the biasing force of the elastic member to the ball.

2. The power tool as defined in claim 1,
   wherein, when the torque acting between the first and second rotating members is lower than the set value, the ball is kept in engagement with the second rotating member, so that torque transmission between the first and second rotating members is effected, while, when the torque acting between the first and second rotating members exceeds the set value, the ball moves in the axial direction against the biasing force of the elastic member acting via the pressing member, so that the engagement of the ball with the second rotating member in the circumferential direction is released and thus the torque transmission between the first and second rotating members is released.

3. The power tool as defined in claim 1,
   wherein at least one of the grooves of the power transmitting region and the power transmission interrupted region maintains about the same curvature as the spherical surface of the ball.

4. The power tool as defined in claim 1 further comprising:
   an intermediate region having a groove continuously formed in the circumferential direction in a depth deeper than or equal to the deepest groove part of the power transmitting region to allow the ball disengaged from the power transmission interrupted region to relatively move to the power transmitting region, wherein, when the ball is in the intermediate region, the pressing member contacts the first rotating member such that the biasing force of the elastic member is prevented from acting upon the ball.

5. The power tool as defined in claim 4 wherein, the groove of the intermediate region maintains about the same curvature as the spherical surface of the ball.

6. The power tool as defined in claim 4 further wherein, the ball disengaged from the power transmission interrupted region moves by rolling in the circumferential direction from the power transmission interrupted region to the power transmitting region.

7. The power tool as defined in claim 4, wherein the groove of the power transmitting region has a side wall and a bottom on the side bounded by the groove of the intermediate region, the side wall comprising a curved surface having about the same curvature as the spherical surface of the ball and extending in the circumferential direction of the second rotating member, and the bottom comprising a curved surface having about the same curvature as the spherical surface of the ball and extending in a direction crossing the circumferential direction of the second rotating member.

8. The power tool as defined in claim 1, wherein the pressing member has a circumferential groove formed in an area of contact with the ball and extending continuously in the circumferential direction of the first rotating member, the circumferential groove comprising a curved surface having about the same curvature as the spherical surface of the ball.

9. The power tool as defined in claim 1, wherein the tool bit is selectively driven at least in one of three driving modes in which the first mode is defined by a drilling operation where the tool bit is rotated to perform a drilling operation to the work-piece, the second mode is defined by a hammering operation where the tool bit is linearly moved to perform a hammering operation to the work-piece and the third mode is defined by a combination of drilling and hammering operations.

* * * * *